(12) United States Patent
Kemeny

(10) Patent No.: US 6,520,283 B2
(45) Date of Patent: Feb. 18, 2003

(54) MECHANICAL SIGNAL FILTER

(75) Inventor: Zoltan A. Kemeny, Tempe, AZ (US)

(73) Assignee: Vistek Inc., Tempe, AZ (US)

( * ) Notice: Subject to any disclaimer, the term of this patent is extended or adjusted under 35 U.S.C. 154(b) by 33 days.

(21) Appl. No.: 09/896,217

(22) Filed: Jun. 29, 2001

(65) Prior Publication Data

US 2002/0064972 A1 May 30, 2002

Related U.S. Application Data

(60) Provisional application No. 60/215,557, filed on Jun. 30, 2000.

(51) Int. Cl.[7] .............................. F16F 15/00; F16M 3/00
(52) U.S. Cl. ..................................... 181/207; 248/638
(58) Field of Search ................................ 181/207, 208, 181/209, 200, 202; 248/638, 559, 677

(56) References Cited

U.S. PATENT DOCUMENTS

| | | | |
|---|---|---|---|
| 5,804,776 A | * | 9/1998 | Bizlewicz .................. 181/207 |
| 5,810,319 A | | 9/1998 | von Flotow et al. |
| 5,929,395 A | * | 7/1999 | Bizliwicz .................. 181/207 |
| 5,942,735 A | * | 8/1999 | Liang ........................ 181/207 |

FOREIGN PATENT DOCUMENTS

DE      4119285 A1    12/1992

* cited by examiner

*Primary Examiner*—Khanh Dang
(74) *Attorney, Agent, or Firm*—Snell & Wilmer LLP

(57) ABSTRACT

This invention generally relates to reducing electronic noise by mechanical means, in order to improve signal quality. More specifically, this invention relates to reducing small amplitude vibrations of analog electronic circuit components, which electronically respond to mechanical movements, such as vibrations. For example, in accordance with an exemplary embodiment of the present invention, a signal-to-noise ratio is improved by gravity-restoring mechanical isolation and transmission-path evasion of signal generating, processing, transmitting, broadcasting, receiving or detecting electronics.

37 Claims, 4 Drawing Sheets

MECHANICAL SIGNAL FILTER

CROSS-REFERENCE TO RELATED APPLICATIONS

This application claims priority to provisional application No. 60/215,557 filed Jun. 30, 2000.

TECHNICAL FIELD

This invention relates generally to filtering and reducing the transmission of undesirable vibrations and signals. More specifically, this invention relates to the filtering of undesirable vibrations and signals by a mechanical means to reduce noise in signals produced by electronic components such as audio/visual components.

BACKGROUND OF THE INVENTION

Noisy music is difficult to enjoy. Similarly, it can be difficult to view a blurry picture on a television screen or video monitor. Electronic devices designed to convey information typically have inherent noise. Generally, as used herein "noise" refers to various properties such as physical vibrations, electrical signals and the like, and similarly, to any other vibrations and/or signals which are generally undesirable and interfere with the intended operation of the device.

Numerous commonplace electronic devices are similarly affected by vibration. For instance, record players, radios, CD players, DVD players, microphones, amplifiers, preamplifiers, power transformers, magnetic resonance imaging equipment, high-speed cameras, and high definition televisions are all susceptible to degradation in reproducing sound and/or visual images because of the interference of vibrations. When these devices are subjected to vibration, vibrational noise can become electrical noise interfering with the intended operation of the electronic device. Often manufacturers of these devices include signal processing filters in the devices to attempt to remove these unwanted signals or noise; however, these signal processing filters may not sufficiently reduce the transmission of and interference caused by undesired signals.

In this respect, the effectiveness of the medium carrying the information is generally proportional to its signal-to-noise ratio; typically an amplitude or a frequency ratio, expressed in percentage of noise-to-signal level or peak. For example, analog circuitry and components generate electronic noise when vibrating. Magnetic-core displacement and capacitor-bank separation movement in a common circuit are examples of electro-magnetic field and current generation or modification. Semiconductor components are also subject to mechanical vibration sensitivity. Similarly, diodes and transistors may also be noisy.

However, in general, analog electronics are typically the most susceptible to vibration. This is generally because noise is additive in analog circuitry. The noisier the components of the circuit, the noisier is the circuit itself is. Large-scale circuit integration, common in modern electronics, is the enemy of signal clarity. This raises the need for noise filtering, reduction, or elimination, especially in signal transmission devices.

Equipment use classifies signal transmission as either external or internal. Signals are externally transmitted between equipment via electrical conductors, fiber optics or other means, such as electromagnetic field, which propagates through vacuums, solids, liquids and gases. For example, one external transmission is a typical radio with a broadcasting station and a remote tuner or receiver. Television broadcasts are similar examples.

Undesirable vibrations can arise from both sources within the electronic device and external sources. External vibrational sources abound in our present environment. These vibrations may be transmitted through the ground and building structures from sources such as vehicles passing on nearby roads and construction. Vibrations may also be transmitted through the air in the form of sound from sources such as airplanes, motors, and other sources of sounds. Many other sources of vibrations exist in buildings, such as the air handling systems, pumps, water running in pipes, and appliances. These vibrations combine, overlap and interfere with each other. Regardless of the original source of the external vibrations, these vibrations may be transmitted through the supporting structure to the tool or electronic device that is resting on the support structure.

Vibrations may also originate from within the device itself. Many modern-day electronic devices contain fans and other mechanical devices which can generate various amounts of vibrations. Tape players and CDs/DVDs include motors to spin the CD/DVD or turn the tape. Many people have heard the familiar hum associated with the working of electronic equipment such as power transformers or amplifiers.

The internal signal transfer between electronic components or units, which does not leave the equipment, is an internal source of noise. Electronic, optical and RF transmissions, both external and internal, are further classified by waveforms and bandwidth. Narrow band RF transmission is achieved by transmitting a single frequency wave, modulated either by amplitude (AM) or by frequency (FM). Digital transmission may be either AM or FM. Digital data however are more efficiently transmitted in ultra wide band (UWB) as pulse or wavelet train, which is modulated by the pulse separation time, which is analogous to FM, but referenced as PM or pulse modulation..

The modulation frequency to base frequency ratio is noise level limited. For example, one can fit more channels into a given broadcasting bandwidth if the signal-to-noise ratio of the channels are smaller. UWB broadcast is less limited by bandwidth, than by noise level to pulse amplitude ratio itself. AM, FM or PM applied in different fields based on their characteristic power need, propagation path or penetration capability. For example, AM waves can travel around the globe, but are easily distorted and decay fast. The FM transmitting and receiving antennas need to "see" each other, since FM wave travels straight, remains strong and less prone for distortion.

In contrast, PM waves thus need very little energy to penetrate solids, and therefore can penetrate structure such as walls. However, its transmitter and receiver are bulky and cumbersome. PM technology is emerging quickly, because it needs no precious bandwidth sharing. Regardless of its nature and type though, to be efficient, the transmissions are preferably noiseless. One way to achieve that goal is to eliminate, or at least reduce, the noise generated or strongly affected by mechanical vibrations.

Micro vibrations also affect semiconductor tool operations in unique ways. For example, roentgen or deep ultra violet (UV) lithographic tools mask or etch nanometer wide wires onto complementary metal oxide (CMOS), silicon, germanium or other semiconductor wafer surface. The printed integrated circuit (IC) quality is strongly affected by direct vibration of the tool's optics but also by the signal-to-noise ratio of the very fine picture. Scanning electron microscopy (SEM) and probing tools in semiconductor fabs are other examples of common micro- or nano-vibration sensitivity. Similar noise-vibration problems arise in modern biotechnology, where tweezers need to manipulate microorganisms, cells and molecules. In these, last category of complex equipment, sometimes it s hard to separate the effects of mechanical noise from electronic, optical and signal transmission noises. Nonetheless, mechanical noise reduction, however, invariably improves performance.

In an effort to reduce electronic and mechanical vibration within equipment, isolation of electronic devices with rubber feet, air bearings, rigid cone legs and high damping elastomeric or felt or cork pads has been attempted. Some of these vibration or noise mitigation techniques intend to reduce noise propagation pathway by cross section or by length. Some form dead-end wave-guides or echo-aside chambers. Others attempt to absorb, dissipate, convert to heat, or otherwise attenuate vibration. Still others simply provide elastic support to the chassis to limit equipment-housing resonance.

While these earlier attempts to reduce equipment vibrations are somewhat successful, they fall short in efficiency and even more in reducing electronic noise. They mostly damp and attenuate (shift the phase of) mechanical vibration without evading it. Unfortunately, however, they often add their own signal to the noise at characteristic frequencies.

Therefore, it has long been recognized that a need exists to prevent external vibrations from interfering with the operation of sensitive devices such as those mentioned above. It is well known that it is desirable to isolate the various components that make up, for example, an audio system, so that the vibrations of one component of the audio system do not interfere with the operation of other components of the audio system. Furthermore, it is desirable to reduce the vibrations that are generated internally by the electronic devices.

SUMMARY

This invention generally relates to reducing electronic noise by mechanical means, in order to improve signal quality. More specifically, this invention relates to reducing small amplitude vibrations of electronic circuit components, which electronically respond to mechanical movements, such as vibrations. For example, in accordance with an exemplary embodiment of the present invention, a signal-to-noise ratio is improved by gravity-restoring mechanical isolation and transmission-path evasion of signal generating, processing, transmitting, broadcasting, receiving or detecting electronics.

DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

In accordance with the present invention, a mechanical signal filter 100 is provided to filter vibrations and reduce noise in devices supported by filter 100. It should be appreciated by one skilled in the art, that the following description is of exemplary embodiments only and is not intended to limit the scope, applicability, or configuration of the invention in any way. Rather, the following description merely provides convenient illustrations for implementing various embodiments of the invention. For example, various changes may be made in the design and arrangement of the elements described in the exemplary embodiments herein without departing from the scope of the invention as set forth in the appended claims.

Figure 1:
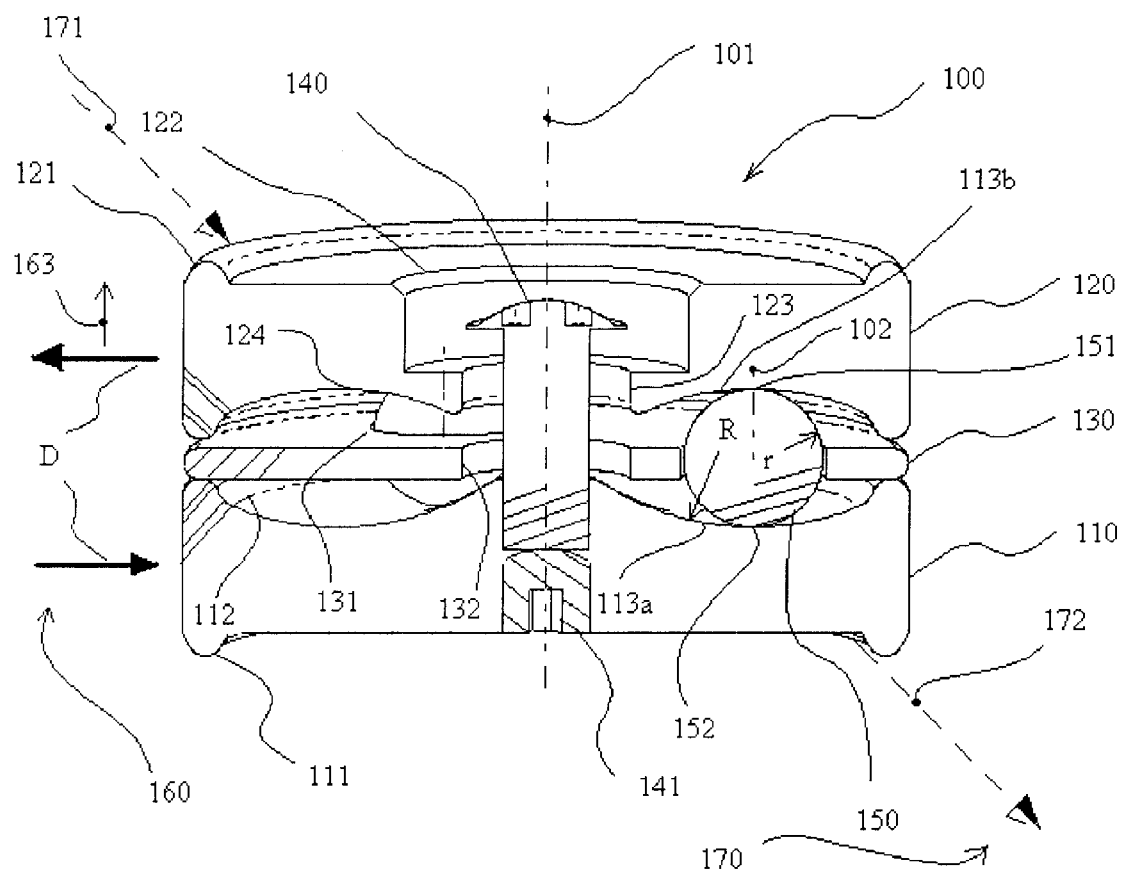
FIG. 1 is a cross-sectional view of an exemplary embodiment of a filter in accordance with the present invention.

Thus, in accordance with an exemplary embodiment of the present invention and with reference to FIG. 1, mechanical signal filter 100 comprises a rolling bearing 150 in contact with at least two surfaces such that rolling bearing 150 may translate between the surfaces in a manner which assists in filtering noise between the surfaces. In accordance with various aspects of the present invention, the invention achieves its objectives by providing a plurality of rigid balls 150 between similarly hard and rigid corresponding circular raceways 113 in a base plate 110 and a top plate 120. In the preferred embodiment, three balls 150 are provided. Additionally, in accordance with various embodiments of the present invention, an optional spacer 130 retains balls 150 within filter 100. For example, with continuing reference to the non-limiting embodiment of FIG. 1, roller bearing 150 comprises a ball bearing manufactured from 440 Rc60 stainless steel. Of course, as mentioned above, other materials having similarly desirable properties now known or as yet unknown may likewise be substituted and still fall within the ambit of the appended claims. Additionally, other modifications of bearing 150 may be useful. For example, a ceramic coated or carbide bearing 150 may be mated with steel raceways 113 having ceramic linings or inserts.

Additionally, although rolling bearing 150 is described in various embodiments herein as a ball bearing 150 with a substantially spherical shape, in accordance with various alternative embodiments, various other configurations of rolling bearing 150 may be used. Thus, it should be appreciated that any rolling bearing that allows the two structures to translate with a substantially reduced area of contact between the touching components is within the ambit of the present invention.

In the presently described embodiment, signal filter 100 comprises base plate 110 and top plate 120 both of a substantially rigid nature in contact with bearings 150 such that bearing 150 may translate between base and top plates 110, 120. Base plate 110 and top plate 120 each have corresponding circular and conical raceways 113a,b oriented around a center 101 of filter 100. Bearings 150 reside in raceways 113a,b. As mentioned above, spacer 130 for retaining balls 150 within filter 100 may be provided. Generally, spacer 130 is configured from Delrin® and takes the form of a circular "washer" shape around filter 100. Of course it should be appreciated that spacer 130 may be configured from any material and the Delrin® is merely exemplary.

In accordance with various aspects of the present invention, base and top plates 110, 120 are suitably secured together during use. For example, in the present exemplary embodiment, plates 110, 120 are held together using a large shoulder assembly screw 140. Additionally, a setscrew 141 may be used to stop large shoulder screw 140 at an appropriate distance to clear top plate 120 before bearing 150 hits screw 140 when filter 100 is displaced during use. Moreover, set screw 141 counter locks, securing filter 100 for shipping. Optionally, a counter bore 122 for screw 140 is provided for clearance and/or to act as a stroke limiter on the displacement of filter 100. Similarly, a bore 131 may be provided in spacer 130 for clearing and retaining bearing 150.

In accordance with the present invention, means for returning bearing 150 to a starting point within raceways 113a,b is also provided. That is, when no external forces are being applied to filter 100, bearings 150 return to a rest state or starting point 102. Although many different methods could be used to return bearing 150 to starting point 102, in accordance with various embodiments of the present invention, the circular or conical shape of raceways 113a,b suitably allow gravity to return bearing 150 to starting point 102. In these embodiments, starting point 102 is the position of lowest potential energy; i.e., the lowest point on raceways 113a,b.

Additionally, as described in additional detail below, in accordance with various aspects of the present invention, bearings 150 are in substantially constant contact with raceways 113 at contact points 151, 152. When a load is placed on filter 100, bearings 150 and raceways 113 slightly indent at contact points 151, 152, expanding the contact area between bearing 150 and raceways 113, but are generally very small relative to the size of bearing 150.

In accordance with various aspects of the present invention a lower raised perimeter 111 is provided on base plate 110 to aid in reducing the contact area between filter 100 and the structure upon which it rests. Similarly, an upper raised perimeter 112 may be provided on top plate 120 to aid in reducing the contact area between filter 100 and the structure which rests upon filter 100.

Figure 2:
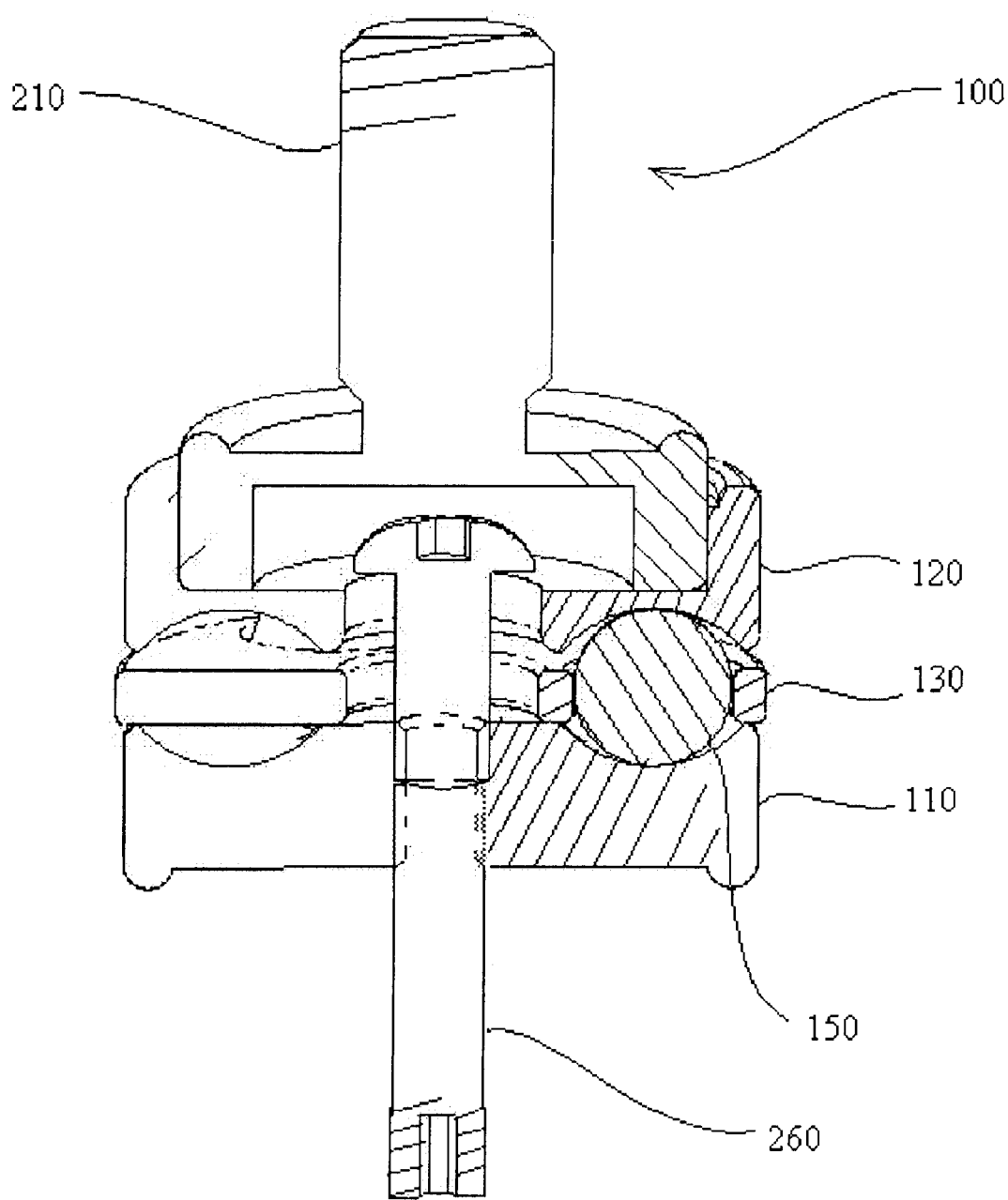
FIG. 2 is a cross-sectional view of an alternative embodiment of a filter in accordance with the present invention.

With reference now to FIG. 2, an alternative embodiment of the present invention is illustrated. Generally, this embodiment of filter 100 is similar to that of FIG. 1, but is capable of being secured to support equipment rigidly. This exemplary embodiment is particularly suited to small equipment or for internal signal filtering in equipment, for example, to isolate electronic printed circuit boards and breadboards.

The present exemplary embodiment has a threaded stud 210 to attach filter 100 to the base of the equipment it is supporting. Filter 100 again generally comprises top plate 120, base plate 110, bearings 150 and spacer 130. Additionally, in accordance with this exemplary embodiment, a locking screw 260 is provided for securing filter 100 to its base (e.g., a floor or table).

Figure 3:
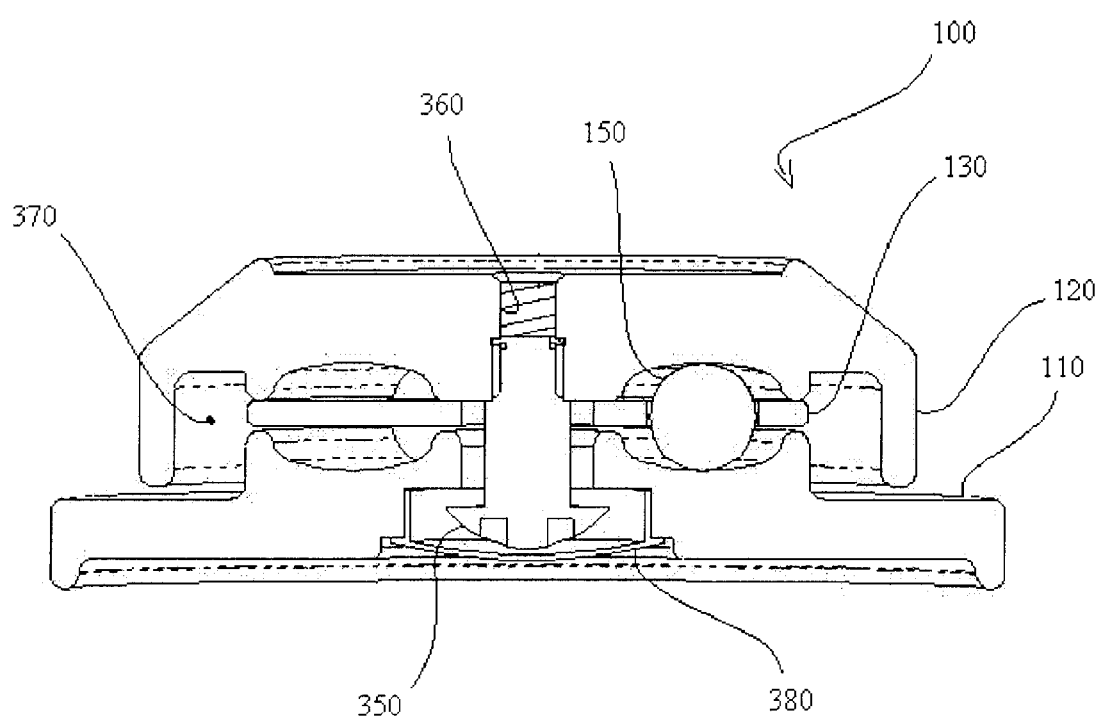
FIG. 3 is a cross-sectional view of another alternative embodiment of a filter in accordance with the present invention.

With reference now to FIG. 3, another alternative embodiment of the present invention is illustrated. Again, this embodiment of filter 100 is similar to that of FIGS. 1 and 2, but is for floor mounting and has additional dust and debris protection. This exemplary embodiment is particularly suited to carpet floor mounting and also provides echo chambers 370 for enhancing filter 100 performance. Filter 100 again generally comprises top plate 120, base plate 110, bearings 150 and spacer 130. This embodiment also includes assembly screw 350 for retaining plates 110,120 together. Additionally, a threaded hole 360 for attachment to equipment is provided. In accordance with another aspect of the this non-limiting embodiment, a dust cap 380 for keeping the internal portion of filter 100 clear is provided. Dust cap 380 may comprise any material, and, in the present embodiment comprises 304 stainless steel.

Figure 4:
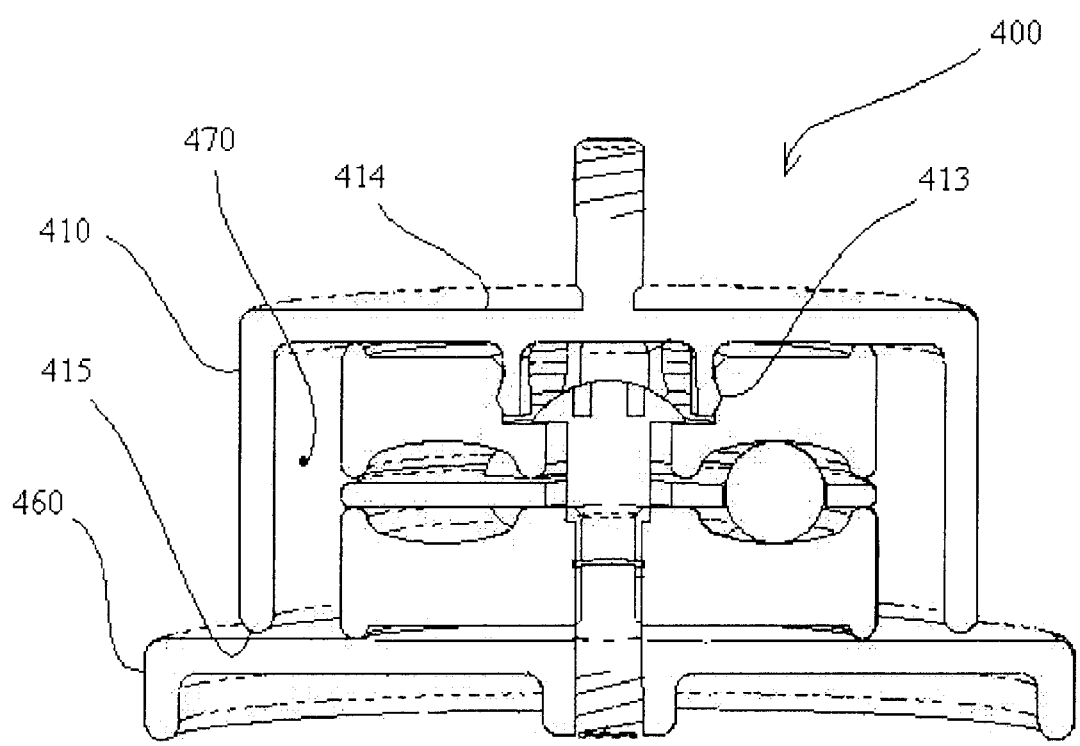
FIG. 4 is a cross-sectional view of still another alternative embodiment of a filter in accordance with the present invention.

With reference now to FIG. 4, still another alternative embodiment of the present invention is illustrated. Again, this embodiment of filter 100 is similar to that of FIGS. 1–3, but is modified to include an optional dust bell/kick cover 410 and wide base support plate for carpet mounting. Filter 100 again generally comprises top plate 120, base plate 110, bearings 150 and spacer 130. This embodiment also has echo chambers 470, though in this particular embodiment, echo chambers 470 are vented 415. This embodiment is also suited to distributing a payload to larger floor area on soft floor, such as carpet or soil (also called the concert leg) because of the addition of a spreader plate 460. This embodiment also includes a mounting surface 414, which optionally has a raised perimeter to reduce contact area and/or may be lined with elastomer or felt or cork or other soft material to aid in effectiveness of filter 100.

Thus, in accordance with the present invention, due to ambient and equipment vibrations, bearings 150 are in a constant oscillation of small, variable amplitude in random directions. Body waves 170, for example, in the form of dynamic pressure variations or sound, pass through bearing 150 only at contact points 151, 152. As mentioned above, the contact areas at contact points 151, 152 are very small, allowing only a narrow clear passage pathway for waves 170 passing through filter 100. Accordingly, a sound wave 171 beginning to pass through filter 100 which does not align with contact points 151, 152 center will refract and disperse in multiple reflections inside bearing 150, without leaving bearing 150. The dispersed wave energy is thus dissipated (largely through heat), and most of wave 171 will never pass through filter 100. This is largely because by the time an exiting wave 172 would have a chance to realign so as to pass through contact point 152, it will likely interfere with other oncoming waves and bearing will have already moved from a position which would allow it to escape bearing 150. Herein, this is called wave return path evasion or transmission path evasion and filter 100 functioning this way can be referred to as an evader.

In this regard, mechanical signal filter 100 suitably allows a supported device (such as a DVD player) to float and roll in response to vibrations either internal to the device or from the structure supporting the device. Vibrations in the supporting structure cause filter 100 to vibrate in all three directions. Vibrations in the two horizontal directions (perpendicular to gravity) cause bearing 150 to displace from 152 starting point and roll up the incline of raceways 113, increasing bearings 150 potential energy and reducing the kinetic energy that otherwise would have been transmitted to the supported device resting on top plate 120. Eventually, gravity returns bearing 150 to starting point 152 and bearing 150 returns to its lowest state of potential energy. In this manner, a reduced amount of energy in the horizontal component of the external vibrations is transmitted to the supported device as vibrations. Similarly, as bearing 150 moves in raceways 113, friction dissipates the energy that has been transmitted to filter 100 and, if the external vibrations cease, bearing 150 will eventually come to rest.

The vibrations which this invention is designed to filter and keep from reaching the supported device supply a harmonic-like force and cause bearing 150 to oscillate and continuously roll within its confined parameters. The rolling motion makes it even more difficult for signals to communicate back and forth between the supported device and the supporting structure. As the vertical vibration component enters bearing 150, bearing 150 is already in motion and corresponding contact points 151, 152 on opposite sides of bearing 150 are shifting out of contact. Therefore, there is no straight path of constant communication between the supported structure and the supporting structure from one moment to the next. And furthermore, a vibration from the supported device that is transmitted to the supporting structure will be less likely to be able to reflect back along the same path to return to the supported device. The frequency of the vibrations correspond to the frequency of oscillation of bearing 150, and therefore bearing 150 is likely to be moving fast enough to interrupt the transmission path of the vibrations.

In this manner, the supported structure and the supporting structure are effectively decoupled and noise from the surrounding environment can be efficiently filtered before reaching the supported structure. This noise can be removed at a very high efficiency and has been tested to remove between 95% and 99.9% of noise and vibration.

In accordance with various aspects of the present invention, some embodiments make evader more efficient than others. For instance, a harder bearing and/or raceway is typically more efficient than softer one. Additionally, the bearing radius to raceway radius ratio and other geometrical and material property conditions can change the performance.

Descriptive Examples

As mentioned above, in operation, when filter 100 is in use, bearings 150 displace (oscillate) within raceways 113. A pseudo natural period of the oscillation is equal to the natural period of a pendulum of length L is:

$$4(R-r)$$

where R is the radius of the curvature of raceway 113 and r is half the distance between contact points (in the various exemplary embodiments, herein, the radius of bearing). Pendulums can be in resonance forced by vibration of a period matching the pendulum period. Therefore, the pendulum's period (equal to the inverse frequency) is natural. However, nonlinear pendulums have no real or natural periods. They oscillate around a frequency, but generally not in resonance. Therefore, the frequency around which a nonlinear pendulum oscillates is called pseudo natural frequency.

Three or more bearings 150 in "doughnut shape" raceways 113 act like a nonlinear pendulum. The pendulum frequencies are independent of the pendulum's bob weight (mass). Thus, the pseudo frequency of filter 100 is also independent of the support load or payload, the equipment weight, placed upon said assembly. However, since the evasion condition calls for the indentation diameter, which is a function of the payload, the evader is load dependent. Thus, the same distinguishes filter 100 in accordance with the present invention from an isolator, which would be non-load dependent.

An optimally performing filter 100 in accordance with the present invention satisfies a transmission evasion condition where a sound propagation constant is greater than a circular frequency constant, or:

$$\frac{2d}{v} > \frac{s}{\omega L}$$

where d is the distance between contact points (in the various exemplary embodiments, herein, the bearing diameter), v is the sound propagation velocity of the bearing material, s is the indentation diameter of the ball at contact, and ω is the circular frequency of the filter as a gravity restoring isolator of equivalent pendulum of length L, and, as mentioned above, L is four times the difference of the raceway cavity radius R and the bearing radius r. This inequality is in time units (e.g., seconds). It states that the time needed for a sound wave to enter into the bearing and return to an entry location is longer than the time needed for the sound wave to travel across the passage line—the line connecting the two contact points—by the mechanical oscillation of the bearing.

1. Embodiment 1

In a first embodiment, filter 100 has an overall diameter of about 1 5/8 inch and is made of 440 stainless steel. This embodiment has bearings 150 of the same material and have a diameter of 5/16 inch [d], with a sound propagation velocity of 318 mile/sec [v]. This same embodiment with a load ranging from 5 lbs. to 100 lbs. has an indentation diameter of 34 micro-inch [s] and a circular frequency of 18 Hz [ω]. For this embodiment, the curvature of raceways 113 is 5/8 inch [R].

Thus, the sound propagation constant:

$$\frac{2d}{v}$$

is 311 nanoseconds (ns) and the circular frequency constant:

$$\frac{s}{\omega L}$$

is 156 ns and therefore the inequality is satisfied.

2. Embodiment 2

In a second embodiment, filter 100 has an overall diameter of about 7/8 inch and is made of 440 stainless steel. This embodiment has bearings 150 of the same material and have a diameter of 3/16 inch [d], with a sound propagation velocity of 318 mile/sec [v]. This same embodiment with a load ranging from 2 lbs. to 33 lbs. has an indentation diameter of 0.47 micro-inch [s] and a circular frequency of 9 Hz [ω]. For this embodiment, the curvature of raceways 113 is 1.4 inch [R].

Thus, the sound propagation constant:

$$\frac{2d}{v}$$

is 19 ns and the circular frequency constant:

$$\frac{s}{\omega L}$$

is 11 ns and therefore the inequality is satisfied.

3. Embodiment 3

In a third embodiment, filter 100 has an overall diameter of about 3 3/8 inch and is made of 440 stainless steel. This embodiment has bearings 150 of the same material and have a diameter of 3/8 inch [d], with a sound propagation velocity of 318 mile/sec [v]. This same embodiment with a load ranging from 9 lbs. to 330 lbs. has an indentation diameter of 45 micro-inch [s] and a circular frequency of Hz [ω]. For this embodiment, the curvature of raceways 113 is 3/4 inch [R].

Thus, the sound propagation constant:

$$\frac{2d}{v}$$

is 37 ns
and the circular frequency constant:

$$\frac{s}{\omega L}$$

is 19 ns
and therefore the inequality is satisfied.

4. Embodiment 4

In a fourth embodiment, filter 100 has an overall diameter of about 3 5/8 inch and is made of 440 stainless steel. This embodiment has bearings 150 of the same material and have a diameter of ¼ inch [d], with a sound propagation velocity of 318 mile/sec [v]. This same embodiment with a load ranging from 5 lbs. to 100 lbs. has an indentation diameter of 52 micro-inch [s] and a circular frequency of 8.8 Hz [ω]. For this embodiment, the curvature of raceways 113 is 1 ½ inch [R].

Thus, the sound propagation constant:

$$\frac{2d}{v}$$

is 24 ns
and the circular frequency constant:

$$\frac{s}{\omega L}$$

is 12 ns
and therefore the inequality is satisfied.

Lastly, while the principles of the invention have been described in illustrative embodiments, many combinations and modifications of the structures described above, as well as arrangements, proportions, elements, materials and components, used in the practice of the invention—in addition to those not specifically described—may be varied and particularly adapted for specific environment or operating equipment, without departing from those principles.

I claim:

1. An apparatus for reducing the transmission of vibrations between structures comprising:
   a bearing operatively situated between a base plate and a top plate; and
   restoring means for returning said bearing to a starting point;
   wherein a sound propagation constant of the apparatus is greater than a circular frequency constant.

2. The apparatus of claim 1, wherein said sound propagation constant is about 1 nanosecond.

3. The apparatus of claim 1, wherein said sound propagation constant is about 19 nanoseconds.

4. The apparatus of claim 1, wherein said sound propagation constant is about 24 nanoseconds.

5. The apparatus of claim 1, wherein said sound propagation constant is about 37 nanoseconds.

6. The apparatus of claim 1, wherein said sound propagation constant is about 311 nanoseconds.

7. The apparatus of claim 1, wherein said circular frequency constant is about 1 microsecond.

8. The apparatus of claim 1, wherein said circular frequency constant is about 11 nanoseconds.

9. The apparatus of claim 1, wherein said circular frequency constant is about 12 nanoseconds.

10. The apparatus of claim 1, wherein said circular frequency constant is about 19 nanoseconds.

11. The apparatus of claim 1, wherein said circular frequency constant is about 156 nanoseconds.

12. The apparatus of claim 1, wherein said bearing is a ball bearing.

13. The apparatus of claim 12, wherein said ball bearing resides in a conical raceway.

14. The apparatus of claim 1, further comprising a spacer.

15. The apparatus of claim 1, further comprising an echo chamber.

16. The apparatus of claim 1, further comprising a dust cap.

17. An apparatus for reducing the transmission of vibrations between structures comprising:
    a bearing operatively situated between a base plate and a top plate; and
    restoring means for returning said bearing to a starting point;
    wherein a sound propagation constant of the apparatus is greater than about 1 nanosecond.

18. The apparatus of claim 17, wherein said sound propagation constant is greater than about 19 nanoseconds.

19. The apparatus of claim 17, wherein said sound propagation constant is greater than about 24 nanoseconds.

20. The apparatus of claim 17, wherein said sound propagation constant is greater than about 37 nanoseconds.

21. The apparatus of claim 17, wherein said sound propagation constant is greater than about 311 nanoseconds.

22. The apparatus of claim 17, wherein said bearing is a ball bearing.

23. The apparatus of claim 22, wherein said ball bearing resides in a conical raceway.

24. The apparatus of claim 17, further comprising a spacer.

25. The apparatus of claim 17, further comprising an echo chamber.

26. The apparatus of claim 17, further comprising a dust cap.

27. An apparatus for reducing the transmission of vibrations between structures comprising:
    a bearing operatively situated between a base plate and a top plate; and
    restoring means for returning said rolling bearing to a starting point;
    wherein a circular frequency constant of the apparatus is less than about 1 microsecond.

28. The apparatus of claim 27, wherein said circular frequency constant is less than about 1 microsecond.

29. The apparatus of claim 27, wherein said circular frequency constant is less than about 11 nanoseconds.

30. The apparatus of claim 27, wherein said circular frequency constant is less than about 12 nanoseconds.

31. The apparatus of claim 27, wherein said circular frequency constant is less than about 19 nanoseconds.

32. The apparatus of claim 27, wherein said circular frequency constant is less than about 156 nanoseconds.

33. The apparatus of claim 27, wherein said bearing is a ball bearing.

34. The apparatus of claim 33, wherein said ball bearing resides in a conical raceway.

35. The apparatus of claim 27, further comprising a spacer.

36. The apparatus of claim 27, further comprising an echo chamber.

37. The apparatus of claim 27, further comprising a dust cap.

* * * * *